United States Patent
Hamada

(10) Patent No.: US 12,010,220 B2
(45) Date of Patent: Jun. 11, 2024

(54) SECURE DIVISION SYSTEM, SECURE COMPUTATION APPARATUS, SECURE DIVISION METHOD, AND PROGRAM

(71) Applicant: NIPPON TELEGRAPH AND TELEPHONE CORPORATION, Tokyo (JP)

(72) Inventor: Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 227 days.

(21) Appl. No.: 17/615,106

(22) PCT Filed: Jun. 10, 2019

(86) PCT No.: PCT/JP2019/022895
§ 371 (c)(1),
(2) Date: Nov. 30, 2021

(87) PCT Pub. No.: WO2020/250269
PCT Pub. Date: Dec. 17, 2020

(65) Prior Publication Data
US 2022/0224516 A1    Jul. 14, 2022

(51) Int. Cl.
*H04L 9/08*    (2006.01)
*G06F 7/535*   (2006.01)

(52) U.S. Cl.
CPC .............. *H04L 9/085* (2013.01); *G06F 7/535* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| 809 A | * | 6/1838 | Walkly | H02K 25/00 310/46 |
| 916 A | * | 9/1838 | Guyon | B62B 19/02 280/13 |

(Continued)

OTHER PUBLICATIONS

Chida et al., "A Three-party Secure Function Evaluation with Lightweight Verifiability Revisited", CSS, 2010, 12 pages including English Translation.

(Continued)

*Primary Examiner* — Sharif E Ullah
(74) *Attorney, Agent, or Firm* — XSENSUS LLP

(57) ABSTRACT

Division is realized with a small number of processing stages. A secure computation apparatus (1) obtains a secret value representing a result of divided N by D using a secret value [N] of a real number N and a secret value [D] of a natural number D. An initialization unit (12) sets a secret value $[P_{L1}]$ of a partial remainder $P_{L1}$ to 0. A parallel comparison unit (13) computes secret values $[E_1], \ldots, [E_{R-1}]$ of comparison results $E_1, \ldots, E_{R-1}$ of comparing a secret value [n] of a partial divisor $n=P_{j+1}R+N_j$ with $[D]\times g$ for each integer g not less than 1 and less than R in parallel. An update unit (14) computes a secret value $[Q_j]$ of a quotient $Q_j$ and a secret value $[P_j]$ of a partial remainder $P_j$ that satisfy $n=DQ_j+P_j$ using the secret values $[E_1], \ldots, [E_{R-1}]$ of the comparison results $E_1, \ldots, E_{R-1}$. An iterative control unit (15) executes the parallel comparison unit (13) and the update unit (14) for each integer j from $L_1-1$ to $-L_0$.

9 Claims, 4 Drawing Sheets

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04L 9/085; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ................ 713/189, 180, 163; 726/2, 21, 36; 380/255, 264, 276
See application file for complete search history.

(56) References Cited

U.S. PATENT DOCUMENTS

| | | | | | |
|---|---|---|---|---|---|
| 12,014 | A * | 11/1854 | Boynton | ................ | D05B 29/06 112/151 |
| 12,019 | A * | 12/1854 | Clark | .................... | F22B 37/428 236/103 |
| 32,007 | A * | 4/1861 | Shaw | ...................... | D05B 73/12 192/41 R |
| 32,014 | A * | 4/1861 | Taylor | ..................... | A61F 5/028 602/19 |
| 32,020 | A * | 4/1861 | Willmot | .................... | E05F 5/06 16/86 A |
| 52,018 | A * | 1/1866 | Blinn | ........................ | E06B 9/24 160/133 |
| 61,998 | A * | 2/1867 | Bushman | ................. | A63C 1/30 280/11.12 |
| 62,004 | A * | 2/1867 | Children | ............... | A01B 35/08 172/333 |
| 62,005 | A * | 2/1867 | Clark | ....................... | F23H 9/00 126/171 |
| 62,018 | A * | 2/1867 | De. La. Mar | ............ | A42C 1/04 223/13 |
| 72,017 | A * | 12/1867 | Gleason | ................. | B29C 33/62 264/130 |
| 82,011 | A * | 9/1868 | Lindsley | .................... | B07B 1/46 209/315 |
| 82,016 | A * | 9/1868 | McFarland et al. | ...... | E05G 1/14 109/29 |
| 82,017 | A * | 9/1868 | McNeil | .................... | B21D 1/06 72/482.94 |
| 102,014 | A * | 4/1870 | Kennedy | ................ | A46B 15/00 15/105 |
| 5,764,765 | A * | 6/1998 | Phoenix | ................ | H04L 9/0858 380/256 |
| 6,748,083 | B2 * | 6/2004 | Hughes | ................ | H04L 9/0858 380/278 |
| 7,437,081 | B2 * | 10/2008 | Mitchell | ................ | H04B 10/70 398/154 |
| 7,995,765 | B2 * | 8/2011 | Schneider | ............... | H04L 9/085 380/278 |
| 8,855,316 | B2 * | 10/2014 | Wiseman | .............. | H04L 9/0855 380/278 |
| 9,960,465 | B2 * | 5/2018 | Dudley | ............... | H01M 50/204 |
| 10,057,058 | B2 * | 8/2018 | Murakami | ........... | H04L 9/0858 |
| 2005/0138352 | A1 * | 6/2005 | Gauvreau | ............. | H04L 9/3247 713/153 |
| 2007/0065154 | A1 * | 3/2007 | Luo | ..................... | H04J 14/0282 398/141 |
| 2007/0076884 | A1 * | 4/2007 | Wellbrock | ............ | H04L 9/0855 380/263 |
| 2007/0195774 | A1 * | 8/2007 | Sherman | ................. | H04L 69/16 370/392 |
| 2010/0046739 | A1 * | 2/2010 | Schneider | ............... | H04L 9/085 380/28 |
| 2011/0206204 | A1 * | 8/2011 | Sychev | ............... | H04J 14/0273 380/256 |
| 2011/0213979 | A1 * | 9/2011 | Wiseman | .............. | H04L 9/0844 713/171 |
| 2014/0010234 | A1 * | 1/2014 | Patel | ....................... | H04L 45/74 370/392 |
| 2014/0068765 | A1 * | 3/2014 | Choi | .................... | H04L 63/1416 726/23 |
| 2014/0133652 | A1 * | 5/2014 | Oshida | .................. | H04L 9/0897 380/255 |
| 2016/0241396 | A1 * | 8/2016 | Fu | ......................... | H04L 9/0836 |
| 2016/0359626 | A1 * | 12/2016 | Fu | ......................... | H04L 9/0858 |
| 2016/0366094 | A1 * | 12/2016 | Mason | ................. | H04L 61/5038 |
| 2017/0214525 | A1 * | 7/2017 | Zhao | ................. | H04W 12/0431 |
| 2017/0230173 | A1 * | 8/2017 | Choi | .................... | H04L 9/0861 |
| 2018/0176091 | A1 * | 6/2018 | Yoon | ................... | H04L 43/0888 |
| 2019/0036821 | A1 * | 1/2019 | Levy | .................. | G06F 12/0868 |
| 2019/0349392 | A1 * | 11/2019 | Wetterwald | ......... | H04L 43/0852 |
| 2020/0084222 | A1 * | 3/2020 | William | .................. | H04L 63/12 |

OTHER PUBLICATIONS

Bogdanov et al., "High-Performance Secure Multi-party Computation for Data Mining Applications", International Journal of Information Security, 2012, vol. 11, No. 6, pp. 403-418.

* cited by examiner

SECURE DIVISION SYSTEM, SECURE COMPUTATION APPARATUS, SECURE DIVISION METHOD, AND PROGRAM

CROSS-REFERENCE TO RELATED APPLICATION

The present application is based on PCT filing PCT/JP2019/022895, filed Jun. 10, 2019, the entire contents of which are incorporated herein by reference.

TECHNICAL FIELD

This invention relates to an applied encryption technology, and more particularly relates to a technology for efficiently performing division without revealing input and output values.

BACKGROUND ART

Methods of obtaining specific operation results without restoring encrypted numerical values include a method called secure computation (e.g., see NPL 1). With the method described in NPL 1, encryption that involves sharing fragments of numerical values between three secure computation apparatuses is performed and the three secure computation apparatuses perform cooperative computation, thereby enabling the results of addition/subtraction, constant addition, multiplication, constant multiplication, logical operations (negation, logical product, logical sum, exclusive OR) and data format conversion (integers, binary numbers) to be held is a shared state, that is, in an encrypted state, between the three secure computation apparatuses, without restoring the numerical values.

In the case of performing division without revealing input and output values, there are methods of realizing Goldschmidt division by secure computation (e.g., see NPL 2).

CITATION LIST

Non Patent Literature

[NPL 1] Koji CHIDA, Koki HAMADA, Dai IGARASHI & Katsumi TAKAHASHI, "A Three-party Secure Function Evaluation with Lightweight Verifiability Revisited", CSS, 2010.

[NPL 2] Dan BOGDANOV, Margus NIITSOO, Tomas TOFT & Jan WILLEMSON, "High-performance secure multi-party computation for data mining applications", International Journal of Information Security, Vol. 11, No. 6, pp. 403-418, 2012.

SUMMARY OF THE INVENTION

Technical Problem

However, in the case of realizing Goldschmidt division by secure computation, it is necessary to use multiplication of fixed-point numbers. With secure computation, there is a problem in that multiplication of fixed-point numbers involves a large number of processing stages, that is, a high communication frequency.

With the foregoing technical problem in view, an object of this invention is to realize division with a small number of processing stages that does not use multiplication of fixed-point numbers.

Means for Solving the Problem

In order to solve the above problem, a secure division system according to one aspect of this invention is a secure division system including a plurality of secure computation apparatuses and for obtaining a secret value representing a result of dividing N by D using a secret value [N] of N and a secret value [D] of D, where R is an integer not less than 3, $L_0$ and $L_1$ are non-negative integers, N is a real number not less than 0 and less than $R^{L_1}$, D is a natural number, $N_{-L_0}, \ldots, N_{L_1-1}$ are values of respective digits from an $L_0$th digit after the decimal point to an $L_1$th digit of an integer part in R notation of N, and j is each integer from $L_1-1$ to $-L_0$, each secure computation apparatus including an initialization unit configured to set a secret value $[P_{L_1}]$ of a partial remainder $P_{L_1}$ to 0, a parallel comparison unit configured to compute secret values $[E_1], \ldots, [E_{R-1}]$ of comparison results $E_1, \ldots, E_{R-1}$ of comparing a secret value [n] of a partial divisor $n=P_{j+1}R+N_j$ with [D]×g for each integer g not less than 1 and less than R in parallel, and an update unit configured to compute a secret value $[Q_j]$ of a quotient $Q_j$ and a secret value $[P_j]$ of a partial remainder $P_j$ that satisfy $n=DQ_j+P_j$ using the secret values $[E_1], \ldots, [E_{R-1}]$ of the comparison results $E_1, \ldots, E_{R-1}$.

Effects of the Invention

According to this invention, division is realized without using multiplication of fixed-point numbers, thus enabling division to be realized with a small number of processing stages.

DESCRIPTION OF EMBODIMENTS

Figure 1:
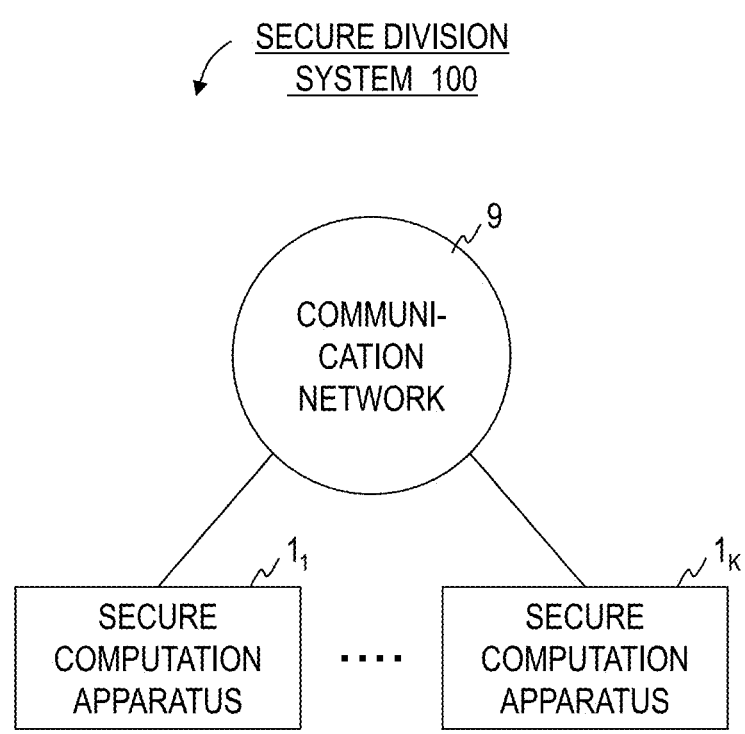
FIG. 1 is a diagram illustrating a functional configuration of a secure division system.

Firstly, the notation method and a definition of terminology in this specification will be described.

<Notation Method>

A value obtained by securing a given value a through encryption, secret sharing or the like will be called a secret value of a, and will be notated as [a]. In the case of the value a being secured through secret sharing, a set of fragments of secret sharing that are held by secure computation apparatuses will be referenced by [a].

[a,b] (square brackets) in the definition range of variables represents a closed interval, and (a,b) (round brackets) represents an open interval. For example, i∈[a,b] represents i taking a value not less than a and not more than b. Also, i∈[a,b) represents i taking a value not less than a and less than b.

<Addition, Subtraction, Multiplication>

Addition, subtraction and multiplication operations on a secure sentence compute secret values $[c_1]$, $[c_2]$ and $[c_3]$ of the respective computation results $c_1$, $c_2$ and $c_3$ of a+b, a−b and ab, with secret values [a] and [b] of the two values a and b as inputs. Execution of these operations is respectively described as in the following formulas.

$$[c_1] \leftarrow \text{Add}([a], [b]), \qquad \text{[Math. 1]}$$
$$[c_2] \leftarrow \text{Sub}([a], [b]),$$
$$[c_3] \leftarrow \text{Mul}([a], [b])$$

If there is no risk of misunderstanding, Add([a],[b]), Sub([a],[b]) and Mul([a],[b]) may be respectively abbreviated to [a]+[b], [a]−[b] and [a]×[b].

<Comparison>

A comparison operation computes a secret value [c] of a Boolean value $c \in \{0,1\}$, with secret values [a] and [b] of the two values a and b as inputs, where a|b. The Boolean value takes 1 when true and 0 when false. Execution of this operation is described as in the following formula.

$$[c] \leftarrow \left([a] \stackrel{?}{\leq} [b]\right) \qquad \text{[Math. 2]}$$

Hereinafter, embodiments of this invention will be described in detail. Note that, in the drawings, constituent elements having the same function will be given the same numerals, and redundant description thereof will be omitted.

Embodiments

A secure division system of an embodiment computes and outputs secret values $[Q_{-L_0}], \ldots, [Q_{L_1-1}]$ of values $Q_{-L_0}, \ldots, Q_{L_1-1}$ of respective digits from an $L_0$th digit after the decimal point to an $L_1$th digit of an integer part in R notation of N/D, with a secret value [N] of a dividend N and a secret value [D] of a divisor D as inputs. Here, R is an integer not less than 3, $L_0$ and $L_1$ are non-negative integers, N is a real number not less than 0 and less than $R^{L_1}$, and D is a natural number. Note that $[N_{-L_0}], \ldots, [N_{-L_0+1}], \ldots, [N_{L_1-2}], [N_{L_1-1}]$ that are used throughout the embodiment are secret values of $N_{-L_0}, N_{-L_0+1}, \ldots, N_{L_1-2}, N_{L_1-1}$ representing R decomposition of N such as in the following formula.

$$N_{-L_0}, N_{-L_0+1}, \ldots, N_{L_1-2}, N_{L_1-1} \qquad \text{[Math. 3]}$$
$$\text{s.t. } N = \sum_{j \in [-L_0, L_1)} N_j R^j + r, \; 0 \leq r < R^{-L_0}, N_j \in [0, R)$$

An example configuration of the secure division system of the embodiment will be described, with reference to FIG. 1. A secure division system 100 includes, for example, K (≥2) secure computation apparatuses $1_1, \ldots, 1_K$, as shown in FIG. 1. In the present embodiment, the secure computation apparatuses $1_1, \ldots, 1_K$ are each connected to a communication network 9. The communication network 9 is a circuit switching or packet switching communication network configured such that connected apparatuses can communicate with each other, and the Internet, a LAN (Local Area Network), a WAN (Wide Area Network) or other such networks can be used, for example. Note that it is not necessarily required for the apparatuses to be able to communicate online via the communication network 9. For example, a configuration may be adopted in which information to be input to the secure computation apparatuses $1_1, \ldots, 1_K$ is stored on a portable recording medium such as magnetic tape or a USB memory, and is input offline to the secure computation apparatuses $1_1, \ldots, 1_K$ from the portable recording medium.

Figure 2:
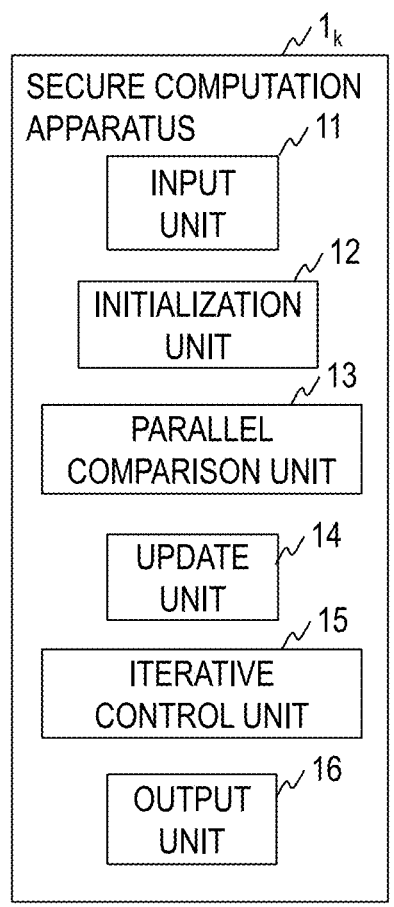
FIG. 2 is a diagram illustrating a functional configuration of a secure computation apparatus.

An example configuration of a secure computation apparatus $1_k$ (k=1, ..., K) included in the secure division system 100 of the embodiment will be described, with reference to FIG. 2. The secure computation apparatus $1_k$ includes, for example, an input unit 11, an initialization unit 12, a parallel comparison unit 13, an update unit 14, an iterative control unit 15 and an output unit 16, as shown in FIG. 2. A secure division method of the present embodiment is realized by this secure computation apparatus $1_k$ (k=1, ..., K) performing the processing of steps described later in cooperation with another secure computation apparatus $1_{k'}$ (k'=1, ..., K, where k≠k').

The secure computation apparatus $1_k$ is a special apparatus constituted by a special program being loaded on a known or dedicated computer having a central processing unit (CPU), a main storage device (RAM: Random Access Memory) and other such constituent elements. The secure computation apparatus $1_k$ executes various processing under the control of the central processing unit, for example. Data input to the secure computation apparatus $1_k$ and data obtained by the various processing is, for example, stored on the main storage device, and the data stored on the main storage device is read out to the central processing unit as needed and utilized in other processing. At least some of the processing units of the secure computation apparatus $1_k$ may be constituted by hardware such as an integrated circuit.

Figure 3:
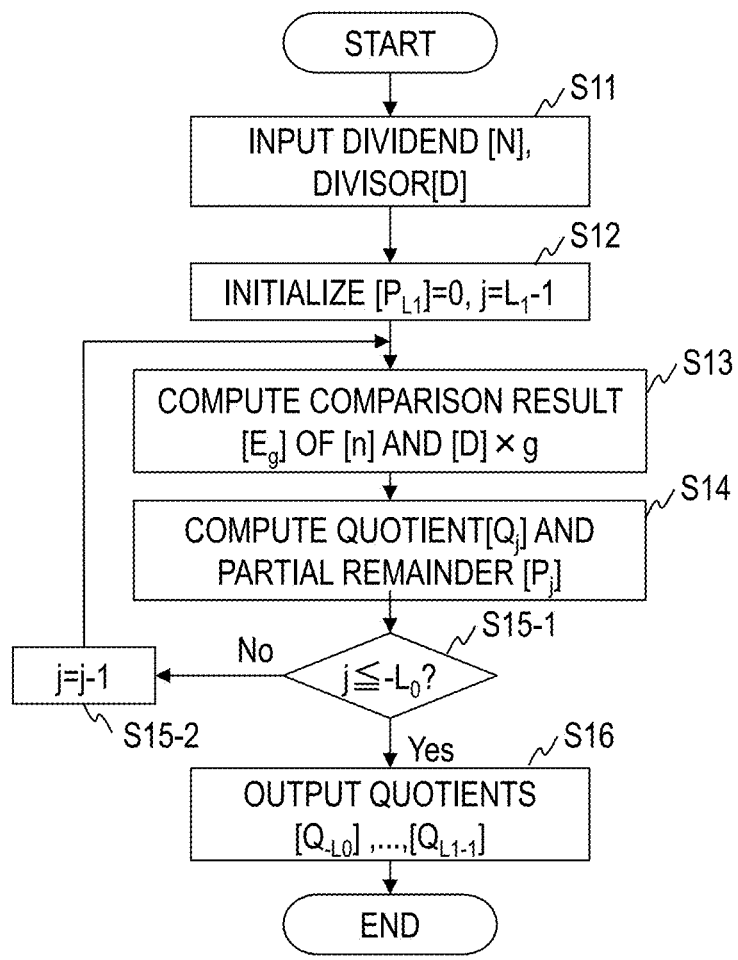
FIG. 3 is a diagram illustrating a processing procedure of a secure division method.

A processing procedure of the secure division method that is executed by the secure division system 100 of the embodiment will be described, with reference to FIG. 3.

In step S11, the secret value [N] of the dividend N and the secret value [D] of the divisor D are input to the input unit 11 of each secure computation apparatus $1_k$. Secret values $[N_{-L_0}], \ldots, [N_{L_1-1}]$ of $N_{-L_0}, N_{-L_0+1}, \ldots, N_{L_1-2}, N_{L_1-1}$ representing R decomposition of the dividend N may be input to the input unit 11, instead of the secret value [N] of the dividend N. In the case where the secret value [N] of the dividend N is input to the input unit 11, the input unit 11 generates the secret values $[N_{-L_0}], \ldots, [N_{L_1-1}]$ of $N_{-L_0}, N_{-L_0+1}, \ldots, N_{L_1-2}, N_{L_1-1}$ representing R decomposition of the dividend N from the secret value [N] of the dividend N. The input unit 11 outputs the secret values $[N_{-L_0}], \ldots, [N_{L_1-1}]$ of $N_{-L_0}, N_{-L_0+1}, \ldots, N_{L_1-2}, N_{L_1-1}$ representing R decomposition of the dividend N and the secret value [D] of the divisor D to the parallel comparison unit 13.

In step S12, the initialization unit 12 of each secure computation apparatus $1_k$ initializes a secret value $[P_{L_1}]$ of a partial remainder $P_{L_1}$ to $[P_{L_1}]=0$. Also, an index j of iterative processing is initialized to $j=L_1-1$. The initialization unit 12 outputs the secret value $[P_{L_1}]$ of the partial remainder $P_{L_1}$ to the parallel comparison unit 13. Also, the index j is output to the iterative control unit 15.

In step S13, the parallel comparison unit 13 of each secure computation apparatus $1_k$ computes a secret value $[E_g]$ ($g \in [1,R)$) of a result of comparing a secret value [n] of a partial divisor n where $n = P_{j+1}R + N_j$ with each [D]×g where $g \in [1,R)$ in parallel. Specifically, the parallel comparison unit 13 computes the secret value $[E_g]$ of the comparison result $E_g$ for each integer g not less than 1 and less than R by the following formula. The parallel comparison unit 13 outputs the secret values $[E_1], \ldots, [E_{R-1}]$ of the comparison results $E_1, \ldots, E_{R-1}$ to the update unit 14.

$$[E_g] = \left([D] \times g \stackrel{?}{\leq} [n]\right) \text{ for } g \in [1, R) \qquad \text{[Math. 4]}$$

In step S14, the update unit 14 of each secure computation apparatus $\mathbf{1}_k$ computes a secret value $[Q_j]$ of a quotient $Q_j$ and a secret value $[P_j]$ of a partial remainder $P_j$, using the secret values $[E_1], \ldots, [E_{R-1}]$ of the comparison results $E_1, \ldots, E_{R-1}$. Note that $Q_j$ and $P_j$ satisfy $n=DQ_j+P_j$, $Q_j \in [0,R)$ and $P_j \in [0,R)$. Specifically, the update unit 14 computes the secret value $[Q_j]$ of the quotient $Q_j$ and the secret value $[P_j]$ of the partial remainder $P_j$ by the following formula. The update unit 14 outputs the secret value $[Q_j]$ of the quotient $Q_j$ and the secret value $[P_j]$ of the partial remainder $P_j$ to the output unit 16.

$$[Q_j] := [E_1] + \ldots + [E_{R-1}],$$
$$[P_j] := [n] - [D] \times [Q_j]$$

[Math. 5]

In step S15-1, the iterative control unit 15 of each secure computation unit $\mathbf{1}_k$ determines whether j is not more than $-L_0$, that is, the truth of $j \leq -L_0$. If $j \leq -L_0$ is false, that is, if $j > -L_0$, the processing is advanced to step S15-2. If $j \leq -L_0$ is true, the processing is advanced to step S16. In step S15-2, the iterative control unit 15 of each secure computation apparatus $\mathbf{1}_k$ decrements j, that is, computes $j=j-1$, and returns the processing to step S13. In other words, the iterative control unit 15 performs control for repeatedly executing the parallel comparison unit 13 and the update unit 14 for each j where $j=L_1-1, \ldots, -L_0$.

In step S16, the output unit 16 of each secure computation apparatus $\mathbf{1}_k$ outputs the secret values $[Q_{-L0}], \ldots, [Q_{L1-1}]$ of the quotients $Q_{-L0}, \ldots, Q_{L1-1}$.

An algorithm that is executed in the abovementioned embodiment is shown below.

1. $[P_{L_1}] = 0$ 2. for $j = L_1-1$ to $-L_0$ do (a) $[n] := [P_{j+1}] \times R + [N_j]$ (b) $[E_g] = \left([D] \times g \stackrel{?}{\leq} [n]\right)$ for $g \in [1, R)$ (c) $[Q_j] := [E_1] + \ldots + [E_{R-1}], [P_j] := [n] - [D] \times [Q_j]$

[Math. 6]

With the configuration of the abovementioned embodiment, division can be realized by comparison of $L_0+L_1$ stages. Since one division requires a small number of stages, execution time is shortened, particularly when repeatedly executing division in series.

The case where R=2 in the abovementioned embodiment is equivalent to computing division in bit units. Division that is computed in bit units requires a large number of stages of comparison. In the abovementioned embodiment, even though the number of comparisons increases by approximately $(R-1)/(\log_2 R)$ times compared with division that is computed in bit units, the number of stages can be reduced by approximately $1/(\log_2 R)$ times.

Although embodiments of this invention have been described above, the specific configuration is not limited to these embodiments, and appropriate design modifications or other such changes that do not depart from the spirit of this invention are intended to be included in the invention. The various types of processing described in the embodiments may be executed not only chronologically in the order of description but in parallel or individually according to the processing capacity of the apparatus that executes the processing or as needed.

[Program, Recording Medium]

Figure 4:
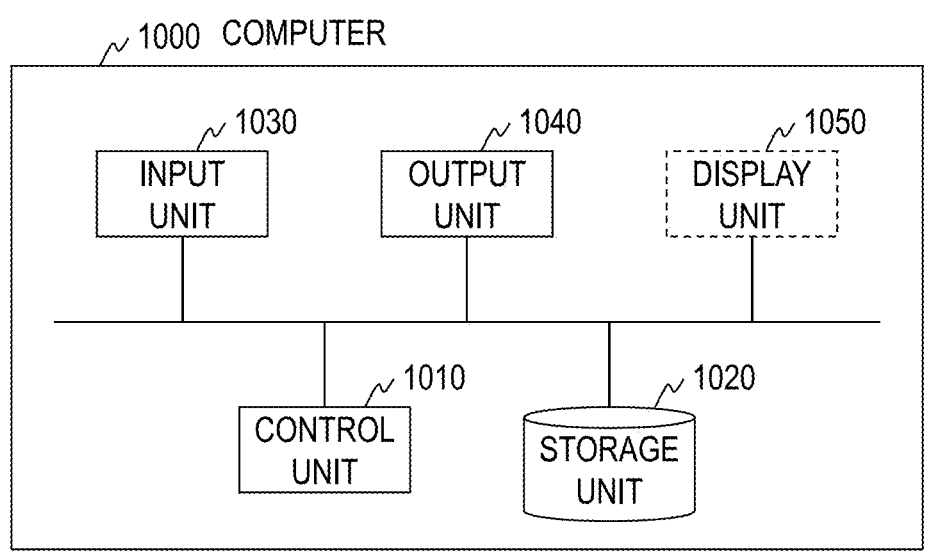
FIG. 4 is a diagram illustrating a functional configuration of a computer.

In the case where the various types of processing functions in the apparatuses described in the abovementioned embodiments are executed by a computer, the processing contents of the functions that would be provided in the respective apparatuses will be described with a program. By loading this program on a storage unit 1020 of the computer shown in FIG. 4 and operating a control unit 1010, an input unit 1030, an output unit 1040 and other such constituent elements, the various types of processing functions of the abovementioned apparatuses will be realized on the computer.

This program describing the processing contents can be recorded on a computer-readable recording medium. The computer-readable recording medium may, for example, be a magnetic recording device, an optical disc, a magneto-optical recording medium, a semiconductor memory or other such medium.

Also, distribution of this program is carried out by a portable recording medium such as DVD, CD-ROM or other such medium on which the program is recorded being sold, transferred, rented and the like. Furthermore, a configuration may also be adopted in which this program is distributed by storing the program on a storage device of a server computer, and transferring the program to other computers from the server computer via a network.

The computer that executes such a program first initially stores the program recorded on the portable recording medium or the program transferred from the server computer on a storage device thereof, for example. At the time of executing processing, this computer reads the program stored on the storage device thereof, and executes processing in accordance with the read program. Also, as other execution modes of this program, a configuration may be adopted in which the computer reads the program directly from the portable recording medium and executes processing in accordance with the read program, and, furthermore, whenever a program is transferred to this computer from the server computer, sequentially executes processing in accordance with the received program. Also, a configuration may be adopted in which the abovementioned processing is executed by a so-called ASP (Application Service Provider) service that realizes the processing functions with only an execution instruction and result acquisition from the server computer, without a program being transferred to the computer. Note that a computer program in the present embodiment is assumed to include any information that is to be processed by an electronic computer equivalent to a computer program (data, etc. that is not a direct set of instructions given to a computer but has the quality of defining processing by a computer).

Also, in this embodiment, the apparatus is configured by executing a prescribed program on a computer, but at least part of the processing contents thereof may be realized in a hardware manner.

The invention claimed is:

1. A secure division system to obtain a secret value representing a result of dividing N by D using a secret value [N] of N and a secret value [D] of D, where R is an integer not less than 3, $L_0$ and $L_1$ are non-negative integers, N is a real number not less than 0 and less than $R^{L1}$, N is expressed in radix R, D is a natural number, $N_{-L0}, \ldots, N_{L1-1}$ are values of respective digits from an $L_0$th digit after the decimal point to an $L_1$th digit of an integer part in R notation of N, and j is each integer from $L_1-1$ to $-L_0$, and $L_1$ is related to the integer part of N and $-L_0$ to $L_{1-1}$ is related to the fractional part of N, the secure division system comprising:

a plurality of secure computation apparatuses connected via a network and that cooperatively compute the secret value representing the result of dividing N by D, each secure computation apparatus comprising processing circuitry that:

sets a secret value $[P_{L1}]$ of a partial remainder $P_{L1}$ to 0;

computes secret values $[E_1], \ldots, [E_{R-1}]$ of comparison results $E_1, \ldots, E_{R-1}$ of comparing a secret value $[n]$ of a partial divisor $n=P_{j+1}R+N_j$ with $[D] \times g$ for each integer g not less than 1 and less than R in parallel;

computes a secret value $[Q_j]$ of a quotient $Q_j$ and a secret value $[P_j]$ of a partial remainder $P_j$ that satisfy $n=DQ_j+P_j$ using the secret values $[E_1], \ldots, [E_{R-1}]$ of the comparison results $E_1, \ldots, E_{R-1}$; and outputs the secret values $[Q_{-L0}]$ to $[Q_{L1-1}]$ of the quotients $Q_{-L0}$ to $Q_{L1-1}$.

2. The secure division system according to claim 1, wherein the processing circuitry computes a secret value $[E_g]$ of a comparison result $E_g$ for g by the following formula:

$$[E_g] = \left([D] \times g \stackrel{?}{\leq} [n]\right). \qquad \text{[Math. 7]}$$

3. The secure division system according to claim 1, wherein the processing circuitry computes the secret value $[Q_j]$ of the quotient $Q_j$ by the following formula:

$$[Q_j] := [E_1] + \ldots + [E_{R-1}] \qquad \text{[Math. 8]}$$

and computes the secret value $[P_j]$ of the partial remainder $P_j$ by the following formula:

$$[P_j] := [n] - [D] \times [Q_j]. \qquad \text{[Math. 9]}$$

4. A secure computation apparatus for use in a secure division system that obtains a secret value representing a result of dividing N by D using a secret value $[N]$ of N and a secret value $[D]$ of D, where R is an integer not less than 3, $L_0$ and $L_1$ are non-negative integers, N is a real number not less than 0 and less than $R^{L1}$, N is expressed in radix R, D is a natural number, $N_{-L0}, \ldots, N_{L1-1}$ are values of respective digits from an $L_0$th digit after the decimal point to an $L_1$th digit of an integer part in R notation of N, j is each integer from $L_1-1$ to $-L_0$, and $L_1$ is related to the integer part of N and $-L_0$ to $L_{1-1}$ is related to the fractional part of N, the secure computation apparatus comprising processing circuitry that, in cooperative computation with other secure computation apparatuses:

sets a secret value $[P_{L1}]$ of a partial remainder $P_{L1}$ to 0;

computes secret values $[E_1], \ldots, [E_{R-1}]$ of comparison results $E_1, \ldots, E_{R-1}$ of comparing a secret value $[n]$ of a partial divisor $n=P_{j+1}R+N_j$ with $[D] \times g$ for each integer g not less than 1 and less than R in parallel;

computes a secret value $[Q_j]$ of a quotient $Q_j$ and a secret value $[P_j]$ of a partial remainder $P_j$ that satisfy $n=DQ_j+P_j$ using the secret values $[E_1], \ldots, [E_{R-1}]$ of the comparison results $E_1, \ldots, E_{R-1}$; and outputs a corresponding one of the secret values $[Q_{-L0}]$ to $[Q_{L1-1}]$ of the quotients $Q_{-L0}$ to $Q_{L1-1}$.

5. A secure division method for execution by a secure division system comprising a plurality of secure computation apparatuses, the secure division system being used to obtain a secret value representing a result of dividing N by D using a secret value $[N]$ of N and a secret value $[D]$ of D by cooperation of the secure computation apparatuses, where R is an integer not less than 3, $L_0$ and $L_1$ are non-negative integers, N is a real number not less than 0 and less than $R^{L1}$, N is expressed in radix R, D is a natural number, $N_{-L0}, \ldots, N_{L1-1}$ are values of respective digits from an $L_0$th digit after the decimal point to an $L_1$th digit of an integer part in R notation of N, j is each integer from $L_1-1$ to $-L_0$, and $L_1$ is related to the integer part of N and $-L_0$ to $L_{1-1}$ is related to the fractional part of N, the secure division method comprising:

setting a secret value $[P_{L1}]$ of a partial remainder $P_{L1}$ to 0 with processing circuitry of each secure computation apparatus;

computing secret values $[E_1], \ldots, [E_{R-1}]$ of comparison results $E_1, \ldots, E_{R-1}$ of comparing a secret value $[n]$ of a partial divisor $n=P_{j+1}R+N_j$ with $[D] \times g$ for each integer g not less than 1 and less than R in parallel with the processing circuitry of each secure computation apparatus;

computing a secret value $[Q_j]$ of a quotient $Q_j$ and a secret value $[P_j]$ of a partial remainder $P_j$ that satisfy $n=DQ_j+P_j$ using the secret values $[E_1], \ldots, [E_{R-1}]$ of the comparison results $E_1, \ldots, E_{R-1}$ with the processing circuitry of each secure computation apparatus; and outputting the secret values $[Q_{-L0}]$ to $[Q_{L1-1}]$ of the quotients $Q_{-L0}$ to $Q_{L1-1}$ with the processing circuitry of each secure computation apparatus.

6. A non-transitory computer-readable recording medium on which a program is recorded for causing a computer to function as the secure computation apparatus according to claim 4.

7. The secure computation apparatus according to claim 4, wherein the secure computation apparatus is connected to the other secure computation apparatuses via a network.

8. The secure computation apparatus according to claim 7, wherein the network includes at least one of a circuit switched network or a packet switched network.

9. The secure division system according to claim 1, wherein the plurality of secure computation apparatuses perform cooperatively compute their respective portion of the secret value representing the result of dividing N by D in parallel.

* * * * *